United States Patent
Amthor et al.

(10) Patent No.: US 12,007,547 B2
(45) Date of Patent: Jun. 11, 2024

(54) MICROSCOPY SYSTEM, METHOD AND COMPUTER PROGRAM FOR ALIGNING A SPECIMEN CARRIER

(71) Applicant: Carl Zeiss Microscopy GmbH, Jena (DE)

(72) Inventors: Manuel Amthor, Jena (DE); Daniel Haase, Zöllnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 477 days.

(21) Appl. No.: 17/477,763

(22) Filed: Sep. 17, 2021

(65) Prior Publication Data

US 2022/0091405 A1 Mar. 24, 2022

(30) Foreign Application Priority Data

Sep. 18, 2020 (DE) .................... 10 2020 124 416.9

(51) Int. Cl.
G02B 21/26 (2006.01)
(52) U.S. Cl.
CPC .................................. G02B 21/26 (2013.01)
(58) Field of Classification Search
CPC .... G02B 21/06; G02B 21/00; G02B 21/0004; G02B 21/008; G02B 21/36; G02B 21/365; G06N 3/02; G06N 3/08; G06N 20/00
USPC ....... 359/391, 362, 363, 368, 369, 392, 393, 359/394; 706/12, 15, 16, 25, 62, 902, 706/903, 924, 932
See application file for complete search history.

(56) References Cited

U.S. PATENT DOCUMENTS

| 2014/0313312 A1 | 10/2014 | Gaiduk et al. |
| 2017/0351081 A1 | 12/2017 | Dowaki et al. |

(Continued)

FOREIGN PATENT DOCUMENTS

| DE | 102013006994 A1 * | 10/2014 | ............. G02B 21/24 |
| DE | 102013222295 A1 * | 5/2015 | ........... F16M 11/046 |

(Continued)

OTHER PUBLICATIONS

Dr. Winterfeldt, DE Application No. 10 2020 124 416.9, Search Report, Feb. 25, 2021, 8 pages (no English translation available).

*Primary Examiner* — Arnel C Lavarias
(74) *Attorney, Agent, or Firm* — LaBatt, LLC (57) ABSTRACT

Aligning a sample carrier of a microscope includes: capturing an overview image in which the sample carrier and/or a sample carrier environment is at least partially visible; evaluating the overview image with a machine learning model of a computer program, which performs an object localization in the overview image with respect to at least one predefined object; evaluating whether the sample carrier is centred in the overview image with the computer program based on the object localization; if the sample carrier is evaluated as not centred in the overview image: determining a centring movement based on the object location with the computer program, the centring movement indicating a sample stage movement for moving the sample carrier towards an image centre of the overview image; performing a sample stage adjustment based on the centring movement; and capturing a centred overview image after the sample stage adjustment has been performed.

20 Claims, 6 Drawing Sheets

(56) References Cited

U.S. PATENT DOCUMENTS

| | | | |
|---|---|---|---|
| 2020/0050891 A1 | 2/2020 | Krueger et al. | |
| 2020/0088984 A1 | 3/2020 | Haase et al. | |
| 2020/0371335 A1 | 11/2020 | Amthor et al. | |
| 2021/0225026 A1* | 7/2021 | Amthor | G06T 7/80 |
| 2022/0236551 A1* | 7/2022 | Amthor | G02B 21/361 |

FOREIGN PATENT DOCUMENTS

| | | | |
|---|---|---|---|
| DE | 102017111718 A1 | 12/2018 | |
| DE | 102018219867 A1 | 5/2020 | |
| DE | 102019113540 A1 | 11/2020 | |
| EP | 2793069 A1 | 10/2014 | |
| EP | 3608701 A1 | 2/2020 | |

* cited by examiner

MICROSCOPY SYSTEM, METHOD AND COMPUTER PROGRAM FOR ALIGNING A SPECIMEN CARRIER

REFERENCE TO RELATED APPLICATIONS

The current application claims the benefit of German Patent Application No. 10 2020 124 416.9, filed on 18 Sep. 2020, which is hereby incorporated by reference.

FIELD OF THE DISCLOSURE

The present disclosure relates to a method for aligning a sample carrier of a microscope. The present disclosure also relates to a microscopy system and a computer program for aligning a sample carrier.

BACKGROUND OF THE DISCLOSURE

Partial or full automation is playing an increasingly important role in microscopes, wherein an overview camera attached to the microscope stand is typically used in this connection. The overview camera captures macroscopic images of the sample stage and an inserted holding frame and/or sample (specimen) carrier.

One use of overview images is for documentation purposes. Another is the derivation of information about the measurement situation from an overview image for a partially or fully automated control of the microscope. For example, a height position of the holding frame and/or sample carrier can be estimated from an overview image or from two different overview images. An overview image can also function as a navigation map that allows a user to select sample areas based on which an automatic navigation or positioning of the sample stage subsequently occurs. In addition, information about the sample type or a degree of contamination of the sample can also be derived from the overview image. A microscope with which an overview image is obtained and assessed has been described, for example, by the Applicant in DE 10 2017 111 718 A1. In this document, a contrast overview image is created from two overview images with different brightnesses. The contrast overview image is subsequently processed by means of a machine learning model, which carries out a classification or segmentation of the image.

In microscopes with a motorized sample stage, the sample stage is first moved to a suitable position prior to the capture of an overview image. The fact that some holding frames have an adjustable surface for supporting sample carriers is particularly problematic in this connection. Consequently, even if the stage position is fixed, the position of the sample carrier is not. A predefined stage position alone thus does not guarantee that the sample carrier is suitably positioned for the capture of the overview image. In the case of non-motorized sample stages, the correct positioning of the sample carrier for the capture of a correct overview image requires an increased effort on the part of the user. In the case of a measurement series with a plurality of sample carriers, it can even be necessary for a suitable stage position to be determined manually for each sample carrier in order to capture a corresponding overview image.

It can be considered an object of the invention to provide a microscopy system, a method and a computer program which enable the capture of an overview image of a sample carrier in a suitably aligned position in a manner that is particularly simple and reliable.

SUMMARY OF THE DISCLOSURE

This object is achieved by means of the methods, by means of the microscopy system and by means of the computer program, each with features described herein.

The method according to the invention for aligning a sample carrier of a microscope comprises at least the following steps: a (first) overview image is captured in which the sample carrier and/or a sample carrier environment is at least partially visible. The overview image is assessed by means of a machine learning model of a computer program, which performs an object localization in the overview image with respect to at least one predefined object. Based on the object localization, the computer program evaluates whether the sample carrier is centred in the overview image. If the result of the evaluation is that the sample carrier is not centred in the overview image, the computer program determines a centring movement based on the object localization. The centring movement indicates a sample stage movement calculated to move the sample carrier towards an image centre of the overview image. A sample stage adjustment (sample stage movement) is performed based on the centring movement. A further overview image is subsequently captured, which is called the centred overview image in this context.

Analogously, a microscopy system according to the invention for aligning a sample carrier comprises a microscope configured to capture an overview image in which the sample carrier and/or a sample carrier environment is at least partially visible. The microscopy system further comprises a computing device configured to assess the overview image by means of a machine learning model, which performs an object localization in the overview image with respect to at least one predefined object. The computing device is also configured to evaluate based on the object localization whether the sample carrier is centred in the overview image. If this is not the case, the computing device determines a centring movement based on the object localization, the centring movement indicating a sample stage movement calculated to move the sample carrier towards an image centre of the overview image.

A computer program of an embodiment according to the invention comprises commands which, when the program is executed by a computer or a microscopy system, cause the execution of the method of the invention. A computer program of a further embodiment according to the invention for aligning a sample carrier of a microscope also comprises commands which, when the program is executed by a computer, cause the following steps to be carried out: receiving an overview image in which the sample carrier and/or a sample carrier environment is at least partially visible; assessing the overview image by means of a machine learning model, which performs an object localization in the overview image with respect to at least one predefined object; and determining a centring movement based on the object localization, the centring movement indicating a sample stage movement calculated to move the sample carrier towards an image centre of the overview image.

The invention reliably enables a suitable positioning of the sample carrier in order to capture an overview image. In particular, a sample carrier that is truncated in the first captured overview image can be displayed in full in the subsequently captured centred overview image. Any action required on the part of a user is either very limited or not necessary at all. Compared to classic assessment algorithms, object localization by means of a machine learning model leads to a substantially better generalizability with regard to changed measurement environments, new types of holding frames or new types of sample carriers.

Optional Embodiments

Advantageous variants of the method, microscopy system and computer program according to the invention are the object of the dependent claims and are explained in the following.

It can be provided that the centred overview image is used for further image processing or microscope control, while the preceding overview image is discarded, i.e. is not used in particular for microscope control or further image processing. With the centred overview image, on the other hand, it is possible, e.g., to create a navigation map, to estimate a height or to select or calculate a lateral position for an autofocus.

The predefined object whose location is localized in the overview image can in particular be a sample carrier, a holding frame and/or a part of a holding frame. In order to permit a precise object localization in as many different applications as possible, a plurality of different models of sample carriers, holding frames or components of holding frames can be predefined. The object localization then occurs as a function of which of these predefined objects is contained and detected in the overview image.

Object Localization by Means of a Machine Learning Model

The machine learning model can be trained with training overview images that at least partially include sample carrier environments and sample carriers. The machine learning model thereby learns to evaluate whether the overview image contains at least one predefined object and to localize this object in the overview image. The machine learning model can comprise at least one deep learning neural network, in particular a convolutional neural network (CNN). The machine learning model can also comprise a plurality of neural networks that carry out processing steps in sequence. For example, a first neural network can generate a segmentation mask in which image areas of the overview image are respectively combined into segments. Subsequently, the segmentation mask is fed to another neural network, which carries out a classification in which, for example, the sample carrier, the holding frame or a specific part of the holding frame is identified as a predefined object. Alternatively, it is also possible to implement a machine learning model for instance segmentation or semantic segmentation, wherein respective semantic labels or instances are indicated for different image segments, which name or label the object. The location of this object in the overview image can then be determined, for example the geometric centre of the holding frame part. Substeps such as the determination of the geometric centre of the previously identified object can also be performed by a classic algorithm without machine learning. In cases where a plurality of neural networks collectively constitute the machine learning model, the individual neural networks can respectively be designated as a machine learning model or sub-model. A machine learning model described in the present disclosure can thus consist of a plurality of in particular concatenated neural networks or machine learning models.

The neural network or networks can be trained by means of supervised learning, unsupervised learning, partially supervised learning or reinforcement learning. Unsupervised learning is particularly suitable for segmentation. A supervised learning can be used, for example, for classification, wherein the training overview images are provided with class labels or target data. For example, one class can label the sample carrier and a plurality of other classes can label different holding frame parts. In a partially supervised learning, only a part of the training images are annotated, for example, a known classification is only specified for a portion of the training images.

Compared to classic image processing algorithms, the machine learning model is more robust so that minor changes or disturbances in the image generally do not lead to errors. Moreover, new types of holding frames can be added easily by means of a new training process. In contrast, a significant amount of time and effort is required when modelling the addition of new types with classic image processing algorithms, since adding a holding frame type has a greater impact on the detection of holding frames that have already been modelled.

The object localization carried out by the machine learning model can in particular relate to a position of a holding frame or holding frame part, a position of one or more brackets of a holding frame and/or a position of a sample carrier. Holding frames often have one or more movable brackets, which are adapted to the dimensions of the sample carrier in such a manner that the sample carrier is held between the brackets. The position of the sample carrier can thus be reliably inferred from the position of a bracket. The position of some immovable parts of the holding frame, on the other hand, may not be directly related to the position of the bracket nor to, as a result, the position of the sample carrier so that these parts only provide information regarding a possible area in which the sample carrier is located. Immovable parts of the holding frame can be used for the localization of the holding frame, however, from which the position or allowed positions of a bracket can be derived. The locations of a plurality of objects can also be determined and used conjointly in the object localization in order to calculate a centring movement.

If the object localization occurs based on a sample carrier environment, e.g. a part of the holding frame, it is not necessary for the sample carrier to be visible in the overview image in order to determine the centring movement.

The machine learning model can carry out the object localization in particular by means of one of the following steps:

A segmentation can be performed by means of which image areas belonging to the holding frame are identified in the overview image or a section thereof. Remaining image areas can be designated as collectively belonging to the background or further differentiated by means of the segmentation; for example, in particular image areas of the sample carrier can also be identified. The output of the segmentation can be an image in which different pixel values designate different segments. Alternatively, the segmentation result can be output in the form of a vector graphic or information regarding the position of the object, e.g., object box coordinates.

It is also possible to discriminate between different holding frame brackets by means of a classification of the overview image or an image created therefrom. The various holding frame brackets differ in their position in relation to the sample carrier. It is thus not only relevant where a holding frame bracket has been determined in the overview image, but what kind of holding frame bracket has been detected. The centring movement then differs depending on which of a plurality of possible holding frame brackets has been determined.

The machine learning model can also use a classification in which a holding frame type or sample carrier type is identified for the object localization. The classification in this case thus indicates not only that a holding frame (part) is contained in the overview image or where a holding frame (part) is located, but also its type. In the preceding training, the machine learning model is trained with training images showing different types of holding frames. A type can be a specific model or a group consisting of a plurality of similar models. Geometric information is respectively stored for different holding frame types as contextual data (relating to the various holding frame types/sample carrier types). The geometric information is used to determine the centring movement. For example, the geometric information can indicate a target position for the identified type of holding frame, i.e. for the sample stage. The geometric information can also comprise information relating to a position between a holding frame opening for sample carriers and holding frame parts or a holding frame perimeter. The foregoing descriptions relating to holding frame types apply, mutatis mutandis, additionally or alternatively, to sample carrier types. The type determination can occur in particular in a supporting function in relation to other described procedures. For example, a corner of a holding frame can be localized by means of the object localization. The type/model identification allows the position of the sample carrier relative to this holding frame to be determined by means of stored values. A suitable shift/translation can then be determined for the localized corner in order to move the sample carrier to the centre of the image.

It is further possible to determine predefined holding frame parts in the overview image by means of a detection. It is in particular possible to detect screws, corners or contours of holding frames or predefined integrated or applied markings on the holding frame. Such markings can be, for example, script or an adhesive label.

The machine learning model can also carry out a localization of an object inserted into a holding frame instead of or in addition to a segmentation, classification or detection of a holding frame (part). The inserted object can in particular be a sample carrier, e.g., a standard slide, a chamber slide or a Petri dish, or a measurement/calibration sample.

Relationship of Object Localization and Centring Movement

A positional relationship between an object localized in the object localization and a position of the sample carrier can be known in advance. For example, it is possible to store the information that, for a holding frame bracket with a straight left edge and a concave right edge, the sample carrier touches the concave right edge. Analogous information can be stored for a holding frame bracket comprising a straight right edge and a concave left edge. Based on the position of the sample carrier inferred from the location of the localized object, a centring movement can be determined in order to change the position of the sample carrier towards the centre of the overview image. The centring movement in this case relates to a sample stage and thereby to the holding frame and the sample carrier. It is also possible for a positional relationship between an object localized in the object localization and a target position for this object to be known directly. If the object is, for example, an outer edge of a holding frame, its target position can lie outside the area shown in the overview image in order to bring the sample carrier to the centre of the overview image. Further variations are possible, e.g., based on the knowledge of a positional relationship between an object localized in the object localization and a reference point. In this case, the location of the reference point can be inferred from the determined position of the localized object and compared with a predefined target location of the reference point in order to determine the centring movement.

The centring movement can indicate solely a direction or both a direction and a path length of the sample stage movement. For instance, if the determination of a centring movement based on the object localization relates to the direction of the sample stage movement only, a fixed path length can be predefined. Once a corresponding sample stage movement has been performed, a new overview image can be captured in order to carry out a follow-up correction or an iterative correction until the sample stage appears centred in the overview image. The specification of a path length can be omitted in cases where overview images are captured continuously (real-time monitoring); instead, it is determined via the continuous capture and assessment of overview images when the required path length has been covered. These procedures can be advantageous in particular when a height position of the sample stage or of the sample carrier is only known imprecisely so that the precision of a path length determination based on the overview image is thus compromised.

With real-time monitoring, one or more further overview images can be captured during or after the performance of the sample stage adjustment. Each further overview image is assessed in the described manner in order to carry out an object localization and determination of a further centring movement. A position can thus be reached in iterative steps at which the centred overview image is captured.

The machine learning model can be trained to calculate the centring movement as an output directly from an input comprising the overview image or an image derived therefrom. For example, the machine learning model in this case can comprise a regression model that outputs a mapping to a translation/centring movement. The object localization occurs as an intermediate step in the layers of the machine learning model without an output of a result of the object localization from the computing process of the machine learning model being required. In the training of the machine learning model, overview images are used for which centring movements with different directions and path lengths are necessary in order to lead to a centred overview image. These centring movements can be predefined in the form of annotations or target data. The machine learning model thereby learns independently to use certain image features in order to infer the centring movement (predefined in the training data). Once the training has been completed, model parameter values of the machine learning model define which image features are used as well as how these image features are used to determine the centring movement. These image features thus define the at least one predefined object of the object localization even if it is generally not possible in this scenario to simply name the objects, e.g., as a holding frame bracket or holding frame screw.

Contextual Data for Determining the Centring Movement

In addition to the object localization, other information (contextual data) can be also exploited in order to determine the centring movement.

The contextual data can be used by a classic algorithm subsequent to an object localization or by the machine learning model during an object localization or by the machine learning model subsequent to an object localization in order to infer the centring movement.

The contextual data can in particular relate to:

Information relating to a side of a holding frame (part) on which the sample carrier is located. This contextual data is useful, for example, when the holding frame (part) is localized in the overview image, but not the sample carrier.

Information from a temporal context, in particular regarding a previous setting or position of the holding frame. If, for example, brackets of a holding frame are movable relative to another holding frame part, it can be assumed that this relative position remains unchanged when overview images are captured in rapid succession. In the event of a sample stage adjustment, jumps in position that are too large can be excluded based on the temporal context, depending on a maximum speed of the sample stage.

A stored 3D model or CAD model corresponding to a determined or known holding frame type can be used as contextual data. Alternatively, the determination of a type of a holding frame detected in the overview image can occur by means of a comparison with CAD models. Using such predefined 3D models, it is possible to infer the sample carrier position relative to the localized object in the overview image or to directly infer the appropriate stage translation in order to move the sample carrier position to the centre of the image.

A voice input by a user can also be used as contextual data. The voice input can relate, for example, to a sample carrier type used, a holding frame type used or a current sample carrier position.

Collision information pertaining to the sample stage in operation can also be exploited as contextual data. For example, an allowed range of movement of the sample stage can be stored. In particular different allowed ranges of movement can be stored depending on microscope components in operation. For example, the allowed range of movement can depend on immersion devices or objectives being used. A comparison can thus be carried out to identify whether the determined centring movement would lead to a sample stage position outside the allowed range of movement. If this is the case, the determined centring movement can be modified, e.g. the path of movement can be shortened, so as to observe the allowed range of movement.

A current sample stage position can also be utilized as contextual data, in particular in combination with the described information regarding allowed ranges of movement of the sample stage. In addition, the sample stage position can also provide, for example, information regarding possible position ranges of holding frames. An object localization of a holding frame part outside this possible position range can thereby be categorized as presumably incorrect. The object localization can then be modified, e.g., another object in the image can be used for the localization.

Other microscope settings can also be used as contextual data. The microscope settings can provide, for example, clues or information regarding the type of sample carrier used, which can in turn be taken into account in a localization of the sample carrier in the overview image. If the sample carrier type is known, a known size of the sample carrier can be used to estimate a distance between movable holding frame brackets, whereupon this distance can be taken into account for locating the holding frame brackets in the overview image.

End-to-End Machine Learning Model

In a further method according to the invention for aligning a sample carrier of a microscope, an overview image is captured in which the sample carrier and/or a sample carrier environment is at least partially visible. The overview image or an image calculated therefrom is entered into a machine learning model. This is to be understood in the sense of "at least one overview image or image calculated therefrom", so that it is also possible to input a plurality of images, for example captured with different capture parameters or from different viewing angles, together. The machine learning model is trained using training data to calculate a centring movement for an input image or input images. The machine learning model accordingly calculates a centring movement based on the at least one input overview image or image calculated therefrom. A sample stage adjustment is then performed based on the centring movement and a centred overview image is captured. It can optionally be provided that a sample stage adjustment only occurs if the calculated centring movement exceeds a predefined minimum quantity.

The training data can comprise annotated overview images, a known centring movement ("ground truth") being predefined for each overview image in the form of annotations. Parameter values of the machine learning model can be determined by means of a supervised learning process so that, after the training, the machine learning model is able to determine a centring movement for an image not encountered during the training.

The machine learning model can comprise the architecture of a convolutional neural network with convolutional, activation and pooling layers. Optional features described in the present disclosure also yield variants of the embodiment of the end-to-end machine learning model.

Actions Based on the Centring Movement

The determined centring movement constitutes a movement instruction that can be used for an automatic sample stage adjustment. Alternatively, the determined centring movement can also be output to a user for a manual sample stage adjustment. The step of performing the sample stage adjustment cited in the method thus occurs either in a motorized manner or manually by the user.

A sample stage position that would result from the centring movement can optionally be compared with a stored allowed position range before the sample stage adjustment is carried out. The allowed position range can be limited in particular by potential collisions or terminal positions of the sample stage. If the resulting sample stage position lies outside the allowed position range, a warning can be output. The user can now perform a manual modification, e.g. arrange the sample carrier differently on the sample stage, whereupon the described method starts again from the beginning, a centring movement for adjusting the sample stage only being implemented when the resulting sample stage position is determined to be within the allowed position range.

General Features

A sample carrier can be any object capable of accommodating one or more microscopic samples. In particular, a sample carrier can be a microscope slide with one or more samples arranged between a transparent carrier plate and one or more cover slips. A sample carrier can also be a chamber slide, a Petri dish or a microtiter plate.

An overview image can be understood as an image showing a sample carrier. Thus, compared to microscopic images, at least sample receptacle walls or an outer edge of the sample carrier are also visible. A separate overview camera can be provided on the microscope stand for capturing the overview image, although it is in principle also possible for an overview image to be captured via what is in fact the microscope camera. In the present disclosure, an overview image can be understood to be either a raw image or an image that has undergone processing. In particular, the overview image can also be a section of a captured image.

A centred overview image generally designates an overview image in which a sample carrier is located closer to the centre of the image than it was in the overview image initially assessed in order to determine the centring movement. The sample carrier does not have to be exactly in the centre of the image in the centred overview image. While the sample carrier in the overview image can be truncated, the sample carrier in the centred overview image is less truncated or not truncated at all. Depending on the size of the sample carrier, however, it is also possible for an outer area of the sample carrier, in particular outside of samples/sample receptacles, to be cropped in the centred overview image. The centred overview image does not have to be captured immediately after the overview image. Instead, it is also possible for an iterative adjustment of the sample stage position to be carried out so that a plurality of overview images are captured and assessed before the centred position is reached.

The centring movement does not necessarily have to indicate a direction that guides the sample carrier exactly to the centre of the image. Instead, more generally, the centring movement can indicate a direction that conveys the sample carrier (in particular its centre) closer to the centre of the image. A path or length of the centring movement can lead precisely to the centre of the image or alternatively merely step by step towards the centre of the image. A step-by-step progression occurs in particular in cases of an iterative adjustment.

Optionally, an evaluation of whether the capture of a centred overview image would display the sample carrier in full can also occur before a sample stage adjustment is carried out and the centred overview image is captured. For example, when a microtiter plate is used as the sample carrier, the entire overview image can be filled by the microtiter plate. It may be possible to determine a centring movement for centring the sample carrier, for example by detecting parts of the sample carrier such as column/line numbers on the microtiter plate. However, it can also be determined, for instance, that the entire sample carrier will not be contained in the centred overview image if the centring movement is implemented, for the simple reason that the dimensions of the sample carrier are greater than the field of view of the overview camera. A similar case arises when a centring movement cannot be determined at all, for example when neither a holding frame nor an edge of the microtiter plate is visible in the overview image and no other object can be located for determining the position of the sample carrier. Instead of the sample stage adjustment and subsequent capture of the centred overview image, it is possible to employ a stitching mode in these cases: in a stitching operation, a plurality of overview images with different sample stage positions are captured and subsequently stitched together into an aggregate overview image.

A microscopy system is understood to be an apparatus that comprises at least one microscope and a computing device. A microscope can in particular be understood to be a light microscope, an X-ray microscope, an electron microscope, a macroscope or a measurement device of some other design with magnification capabilities that is configured to capture images (microscope images).

The computing device can be designed to be an integral part of the microscope, arranged separately in the vicinity of the microscope or be arranged at a remote location at any distance from the microscope. The computing device can also be designed to be decentralized and communicate with the microscope via a data link. It can generally be formed by any combination of electronics and software and comprise in particular a computer, a server, a cloud-based computing system or one or more microprocessors or graphic processors. The computing device can also be configured to control the microscope camera, image capture, the sample stage drive and/or other microscope components.

The characteristics of the invention that have been described as additional apparatus features also yield, when implemented as intended, variants of the method according to the invention. Conversely, the microscopy system can also be configured to carry out the described method variants. In particular, the computing device can be configured to carry out the described method variants and output commands for the execution of described method steps. The computing device can also comprise the described computer program. Variants of the computer program according to the invention result from the fact that the computer program comprises commands for executing the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

Figure 1:
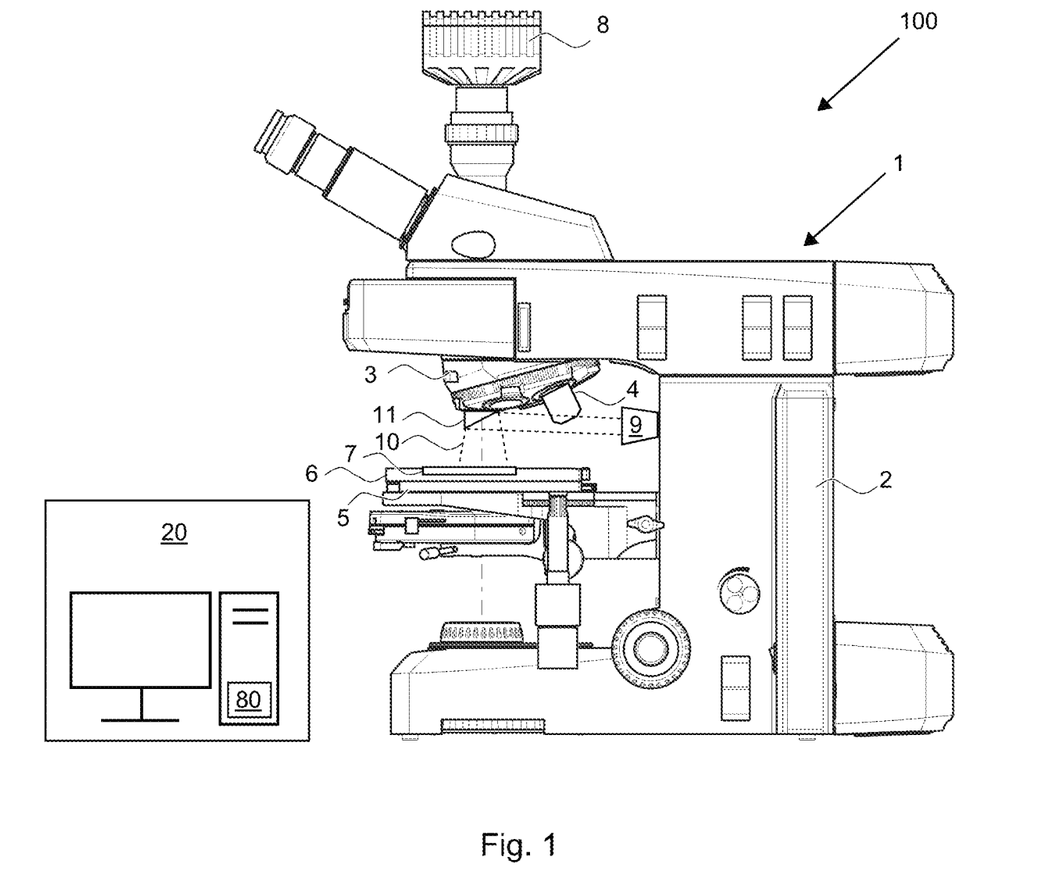
FIG. 1 is a schematic illustration of an example embodiment of a microscopy system according to the invention.

FIG. 1

FIG. 1 shows an example embodiment of a microscopy system 100 according to the invention. The microscopy system 100 comprises a computing device 20 and a microscope 1, which is a light microscope in the illustrated example, but which in principle can be any type of microscope.

The microscope 1 comprises a stand 2 via which further microscope components can be supported. The latter can in particular include: an objective changer/revolver 3, on which an objective 4 is mounted in the illustrated example; a sample stage 5 with a holding frame 6 for holding a sample carrier 7 and a microscope camera 8. If the objective 4 has been rotated so as to be located in the microscope light path, the microscope camera 8 receives detection light from one or more samples supported by the sample carrier 7.

The microscope 1 further comprises an overview camera 9 for capturing an overview image of the sample carrier 7 or of the holding frame 6. A field of view 10 of the overview camera 9 is illustrated by means of dashed lines. In the illustrated example, the overview camera 9 views the sample carrier 7 via a deflection mirror 11. The deflection mirror 11 is arranged on the objective revolver 3 and can be selected instead of the objective 4. In variants of this embodiment, the deflection mirror or some other deflection element can also be arranged at a different site. Alternatively, the overview camera 9 can be arranged on the stand 2 so as to view the sample carrier 7 directly without a deflection mirror 11. In principle, an image captured by the microscope camera 8 can also constitute an overview image, in particular when a macroobjective is selected for this purpose via the objective revolver 3.

The overview image is processed by the computing device 20 and used for various functions. For example, the computing device 20 uses the overview image to generate a navigation map in which a microscope user can select a location based on which an adjustment of the sample stage 5 then occurs automatically. The overview image can also be assessed for a determination of the height position of the sample carrier 7. Numerous other automated steps can also occur based on the overview image.

If the overview image of the sample carrier 7 is defective, it may not be possible to carry out the steps described above or only to carry them out imprecisely. In order to capture the best possible overview image, the computing device 20 is configured to carry out or command an alignment of the sample carrier 7 by means of a computer program 80. This is described in greater detail in the following with reference to the remaining figures.

FIGS. 2 to 6

Figure 2:
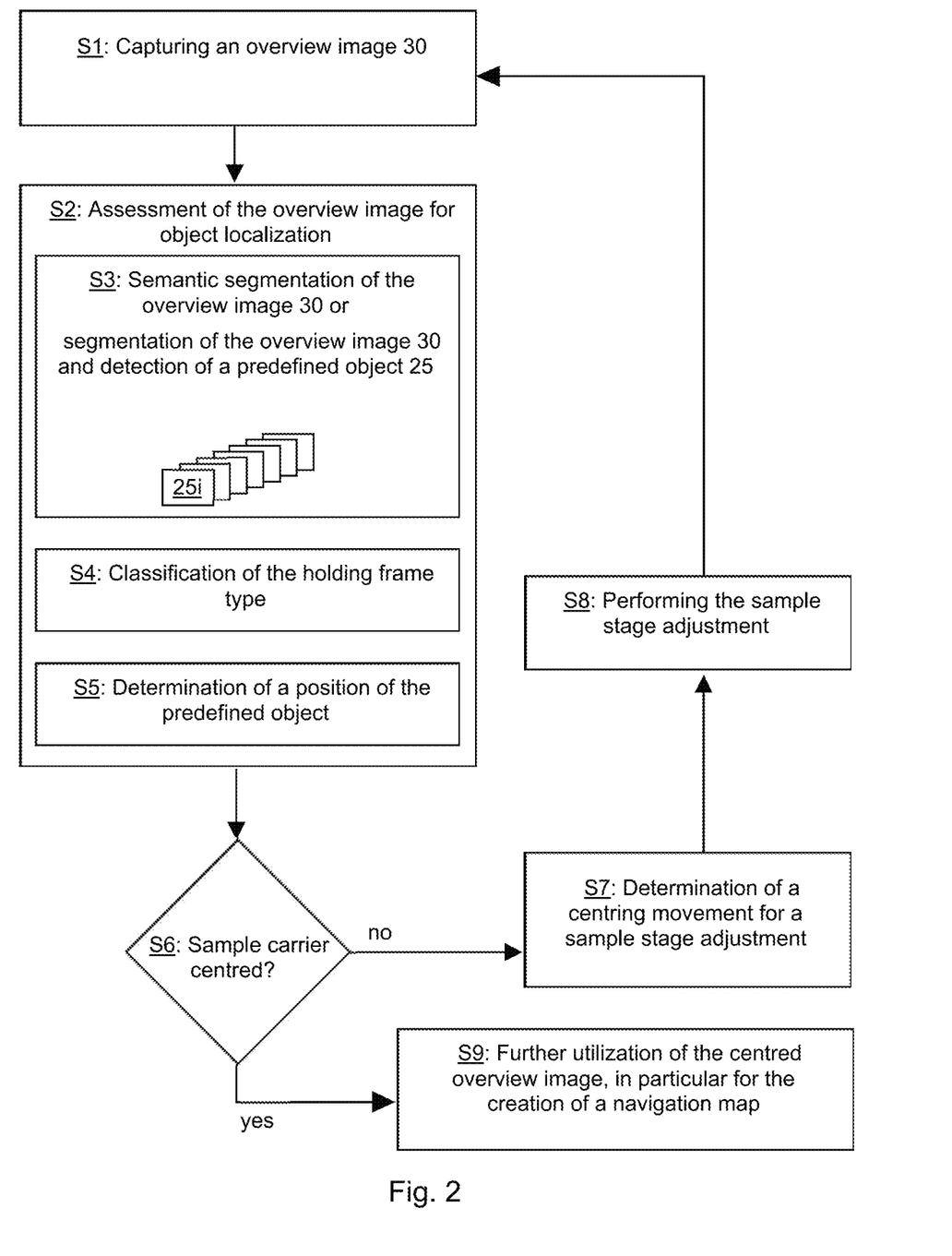
FIG. 2 shows a flowchart of an example embodiment of a method of the invention.

FIG. 2 shows a flowchart of an example embodiment of a method of the invention. The computing device described with reference to FIG. 1 is configured to carry out or command the steps of this method. FIGS. 3 to 6 show overview images or images calculated from the same, to which the description of the method of FIG. 2 refers.

Figure 3:
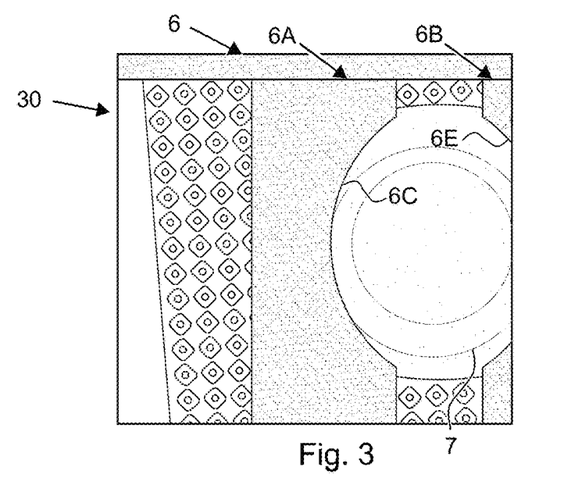
FIG. 3 shows an overview image in which a sample carrier is not centred.

In the method, an overview image 30, as illustratively depicted in FIG. 3, is first captured in step S1. The sample carrier 7 and a sample carrier environment—in the illustrated example parts of the holding frame 6, in particular a first holding-frame bracket 6A and a second holding-frame bracket 6B—are discernible in the overview image 30. The two holding frame brackets 6A and 6B have rounded or concave holding sides 6C and 6E that face each other in order to hold the sample carrier 7 between them. In the illustrated example, the holding frame brackets 6A, 6B are movable relative to a main body of the holding frame 6 in order to be able to hold sample carriers 7 of different sizes. The mobility of the holding frame brackets 6A, 6B results in a variability of the position at which the sample carrier 7 is held, even when the position of the main body of the holding frame 6 on the sample stage is predefined. In the illustrated example, the sample carrier 7 is not centred in the overview image 30, but is truncated at its edge. The adjacent holding frame bracket 6B is also barely visible in the overview image 30.

The overview image 30 is now assessed in order to determine, via an object localization, a centring movement by means of which the sample carrier 7 is centred in the overview image.

Figure 4:
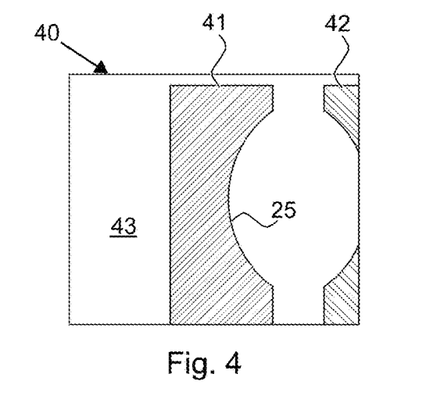
FIG. 4 shows a segmentation mask calculated from the overview image.

Step S2 thus follows in FIG. 2, in which step an assessment of the overview image occurs for the purposes of an object localization. A machine learning model is used to evaluate whether at least one predefined object is contained in the overview image; if this is the case, an object localization is performed in the overview image. The object localization can be implemented in various ways; in the illustrated example, it is implemented by steps S3 to S5. A segmentation of the overview image 30 is performed in S3, in particular with a machine learning model trained for this purpose. A segmentation mask 40 as illustrated in FIG. 4 is generated by this means. In the segmentation mask 40, related areas are labelled as belonging to one area, for example via the allocation of the same pixel value. It is thus possible for a segmentation mask to be, for example, a binary mask with only two possible pixel values. A division into three different image segments occurs in the illustrated example, two image segments 41 and 42 corresponding to the two holding frame brackets 6A and 6B and the third image segment 43 indicating a background. A semantic segmentation mask 40 is generated in this example, i.e. not only does there occur a division into three image segments 41-43, but a meaning is also assigned to the respective image segments 41-43. The meaning identifies the holding frame brackets 6A, 6B as such. The holding frame brackets 6A, 6B or parts thereof can represent the at least one predefined object 25 to be localized. An advantage of the segmentation mask 40 is that surface structures of holding frames 6 do not adversely affect image analysis. Scratches or script, for example, are not included in the segmentation mask 40. If a holding frame type should be modified, for example if the manufacturer changes the arrangement of screws or labels, no new training is required since image content of the holding frame surface, i.e. in particular screws or labels, is removed by the segmentation.

The illustrative machine learning model is trained to discriminate at least between the classes "holding frame" and "background" or more precisely between the classes "first holding-frame bracket", "second holding-frame bracket" and "background".

Alternatively, a detection of a predefined object can occur in a non-semantic segmentation mask 40 or directly in the overview image 30. In the detection, the predefined object can be, for example, a holding frame part, in particular a holding frame bracket or a part of the same, e.g. one or more holding frame corners.

Different objects can be depicted in the overview image depending on the measurement situation, for example, one or more holding frame brackets, a holding frame without movable brackets, a corner of a chamber slide, prominent areas of various other sample carrier types or holding frame types. In order to enable an object localization in as many different measurement situations as possible, identifying information 25$i$ can be stored for a plurality of different predefined objects, in particular for the aforementioned examples. The identifying information 25$i$ is utilized by a computer program that executes the image processing steps to find at least one of these objects in the overview image or the segmentation mask. If none of the predefined objects can be determined in the overview image, a warning is output (not indicated in FIG. 2).

Optionally, a classification can be carried out by means of a machine learning model in accordance with step S4. The segmentation mask 40 is used as the input image in this case, although it is alternatively also possible to use the overview image 30 as input. A distinction can be made in the classification between different types of holding frames or sample carriers. Contextual data is stored for the different types, for example relating to the geometric dimensions of the corresponding holding frame or sample carrier.

A determination of the position of the predefined object occurs in step S5. The position can be indicated, for example, by image coordinates in the overview image. In the case of a holding frame bracket, in particular its centre or a corner point can be used for describing its position.

Of steps S3 to S5, two or even all three steps can occur by means of a shared calculation process. For example, the object detection of step S3 and the position determination of step S5 can be performed as a single operation by a trained machine learning model that outputs coordinates of a detected object directly. A segmentation with further computation can also be carried out by a single trained machine learning model, which can in particular include two or more concatenated machine learning models. It is thus not necessary to output a segmentation mask, which can optionally merely be encoded in the form of a feature vector, i.e. not necessarily as a two-dimensional image, in a layer of the underlying neural network, Once the position of the predefined object has been determined, it is checked in step S6 whether the sample carrier is centred. To this end, for example, the position determined in S5 can be compared with an allowed range of values. In cases involving two movable holding frame brackets 6A, 6B, step S6 can also occur by means of an evaluation of whether at least predefined portions of both holding frame brackets 6A, 6B are included in the overview image 30 or segmentation mask 40.

If this is not the case, a centring movement for a sample stage movement is calculated in step S7. In order to derive a direction and optionally a distance for a sample stage movement from the overview image 30, the camera used to capture the overview image 30 can be calibrated in relation to the microscope stand. For example, a captured image of a calibration pattern can be used to predefine how a position on the sample stage is related to a position in the overview image. The centring movement can thus be determined from the determined position of the predefined object in the overview image (or an image derived from the same), for example by comparing the determined position with a predefined target position for the predefined object.

The sample stage movement is subsequently carried out in step S8. A motorized sample stage is controlled according to the centring movement. In the case of a non-motorized sample stage, the centring movement is output to a user, for example via a computer screen.

After the sample stage movement has been carried out, a new overview image is captured. In the illustrated example, this takes the form of a loop in which step S8 is followed by step S1. This yields a control loop in which, after the new overview image has been processed according to step S2, it is checked in step S6 whether the sample carrier is now centred. In principle, this control loop can also be omitted so that the overview image captured after step S8 constitutes the centred overview image directly.

Figure 6:
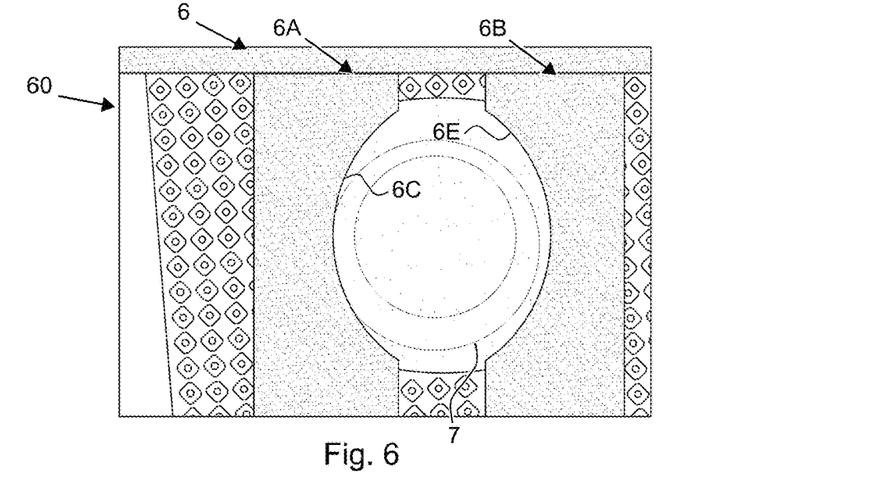
FIG. 6 shows a centred overview image.

In the illustrated variant embodiment, if it is determined in step S6 that the sample carrier is sufficiently centred, step S9 follows. In this step, the most recently captured overview image is used as the centred overview image, while one or more previously captured, non-centred overview images are discarded. In particular, a navigation map can be formed from the centred overview image, which is used to designate sample areas to be analyzed. A centred overview image 60 is shown in FIG. 6. The image content of the latter is shifted vis-à-vis the overview image 30 according to the centring movement so that the sample carrier 7 is now entirely visible.

Figure 5:
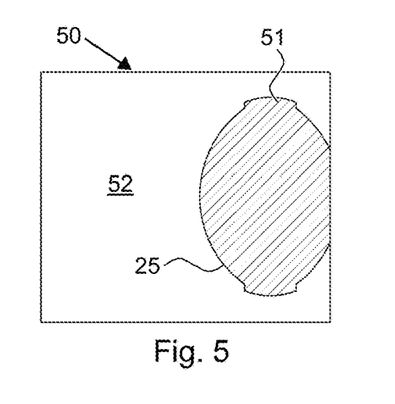
FIG. 5 shows an alternative segmentation mask calculated from the overview image.

The described variant embodiment can be modified in particular with regard to which predefined objects are the subject of the object localization. In the segmentation of the overview image 30 according to step S3, image areas of the sample carrier 7 can thus be segmented instead of parts of the holding frame. FIG. 5 shows a segmentation mask 50 in which an image segment 51 labels image areas of the sample carrier 7 and any remaining image areas are represented by an image segment 52 ("background"). Analogously to the preceding description, the image segment 51 can be identified as a sample carrier and the position of the image segment 51 or a part of the same is determined. The sample carrier constitutes the predefined object 25 to be localized in this case. Its determined position is in turn used to determine a centring movement.

Figure 7:
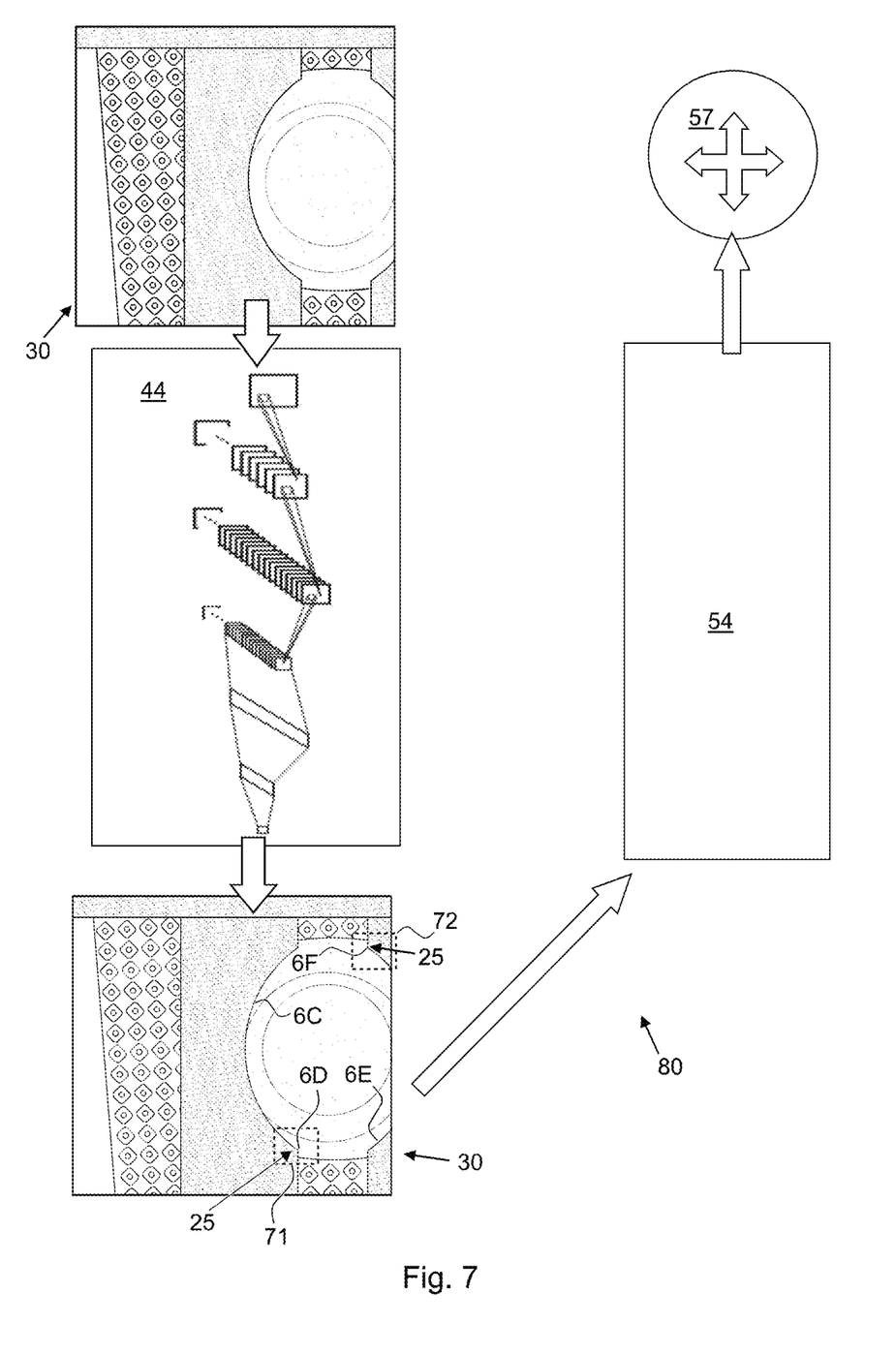
FIG. 7 is a schematic illustration of processing steps for determining a centring movement based on an overview image, according to example embodiments of the invention.

FIG. 7

A further variation of the preceding variant embodiments is illustrated with reference to FIG. 7. In this case, instead of a segmentation, there occurs a detection of a predefined object in the overview image.

The overview image 30 is fed to a machine learning model 44 which is trained to detect/identify objects. The output of the machine learning model 44 can comprise image coordinates or other information relating to the location of the detected object or objects. In the present example, the image coordinates are indicated by at least one bounding box 71, 72 with which a detected object 25 is framed. FIG. 7 shows the overview image 30 with delineated bounding boxes 71, 72 for the purposes of illustration while it is in fact sufficient if the output of the machine learning model merely comprises image coordinates such as the bounding boxes 71, 72. In the illustrated example, the localized objects 25 are corners 6D, 6F of the two holding frame brackets 6A, 6B, more precisely corners 6D, 6F delimiting the concave holding sides 6C, 6E.

The determined locations are calculated in relation to a predefined target location in order to determine the centring movement. In the illustrated example, the output of the machine learning model 44 is fed to a classic program 54 to this end, which calculates a centring movement 57 without a machine learning model. The program 54 has a database in which target coordinates and a relationship with the detected objects of the machine learning model 44 are stored. For example, respective target coordinates can be stored for a plurality of objects that can generally be detected by the machine learning model 44. The program 54 thus selects the target coordinates associated with the object detected by the machine learning model 44. Based on these target coordinates, the program 54 calculates an offset for the coordinates of the detected object determined by the machine learning model 44 (e.g. by taking the difference between these coordinates) in order to determine the centring movement 57.

The stored target coordinates can also relate to an object other than the detected object. In the illustrated example, the objects detected by the machine learning model 44 are corners 6D, 6F of the holding frame brackets 6A, 6B. Based on the coordinates of these corners 6D, 6F, the program 54 can calculate a sample carrier position. For example, the centre of the sample carrier 7 can be estimated as the midpoint of the distance between the two corners. The stored target coordinates can thus indicate a sample carrier target position. The path distance of the movement results as the difference between the sample carrier target position and the determined sample carrier position.

The predefined target location can also be a function of geometric information derived from the overview image. For example, the size of the sample carrier 7 used can be gauged from a distance between the corners 6D, 6F of the two movable holding frame brackets 6A, 6B. Such geometric information can also be used to determine the centring movement or to estimate in advance whether it is even possible to capture the sample carrier 7 in full in a single overview image by means of a centring movement.

The machine learning model 44 and the program 54 together represent an example embodiment of the computer program 80 according to the invention. In principle, the functions of the program 54 can also be implemented by a machine learning model.

Figure 8:
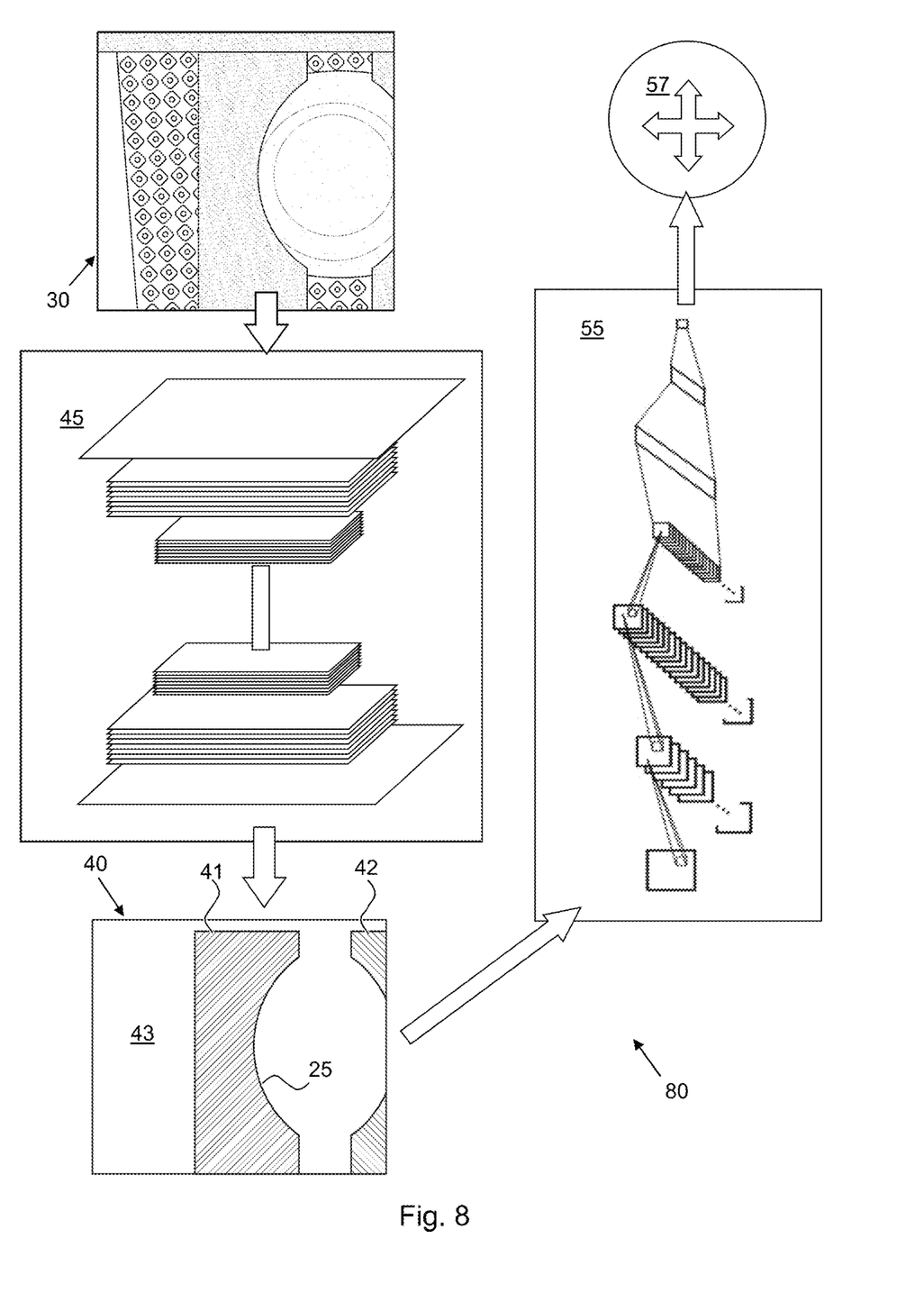
FIG. 8 is a schematic illustration of processing steps for determining a centring movement based on an overview image, according to further example embodiments of the invention.

FIG. 8

FIG. 8 illustrates schematically a further implementation of steps of FIG. 2. An object localization occurs in an overview image 30 in order to determine a centring movement.

To this end, the overview image 30 is fed to a segmentation machine learning model 45, which is a convolutional neural network (CNN) in this case. The latter is trained to generate a segmentation mask 40 from an input image.

The segmentation mask 40 is fed to a regression machine learning model 55. The latter is trained to generate a mapping from a segmentation mask to a translation path or centring movement 57. A regression model is used to this end, which can have been formed by a supervised learning process in which an associated translation path or centring movement was predefined for each training image (each segmentation mask), in particular manually. Using the predefined training data, the regression machine learning model 55 learned independently how to use features of a segmentation mask 40 to calculate a centring movement 57. Model parameters, the values of which were determined in the learning process, define how objects of the segmentation mask 40 are incorporated in the calculation of the centring movement 57.

The segmentation mask 40 output by the segmentation machine learning model 45 can be a semantic segmentation mask 40 in which different objects are not only detected as different, but assigned semantic labels/meanings. Predetermined objects are identified by means of the latter so that an object localization occurs by means of the semantic segmentation mask 40. In the illustrated example, coordinates relating to both holding frame brackets 6A, 6B are captured. The knowledge of which objects are depicted in the segmentation mask 40 can be utilized in the following step of determining the centring movement 57. In a variation of this embodiment, the segmentation machine learning model outputs a non-semantic segmentation mask. In this case, an identification or detection of the objects depicted in the segmentation mask can occur in a step prior to the regression machine learning model; alternatively, the non-semantic segmentation mask can be input directly into an appropriately trained regression machine learning model. In the latter case, an object localization occurs in the sense that various objects together with respective information regarding their location are determined through the segmentation, i.e. which image pixels belong to which objects, and through the regression machine learning model it is defined which of these objects as well as how their locational information is used in the calculation of the centring movement.

Figure 9:
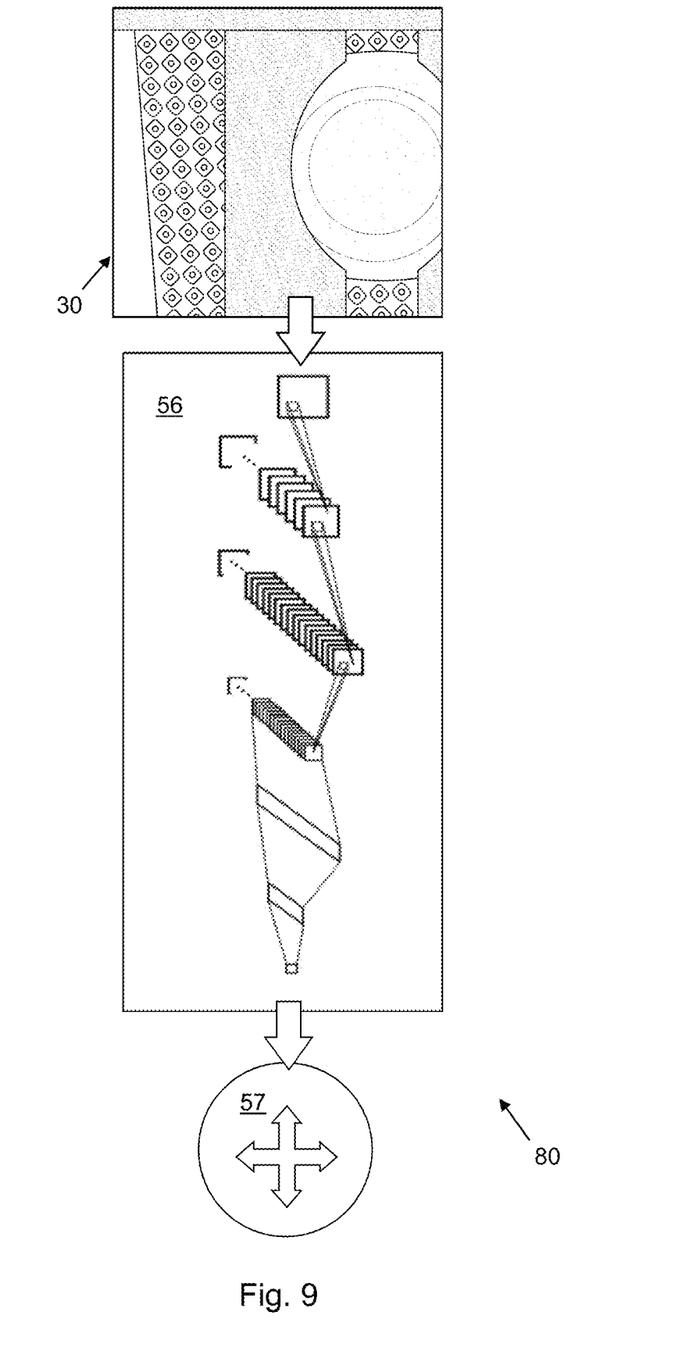
FIG. 9 is a schematic illustration of a processing of an overview image for the determination of a centring movement, according to a further example embodiment of the invention.

FIG. 9

FIG. 9 illustrates schematically an example embodiment of a further method according to the invention for aligning a sample carrier of a microscope. A machine learning model 56 is used in this case, which calculates and outputs a centring movement 57 directly from an input image. As a result, the machine learning model 56 can also be called an end-to-end model.

The input of the machine learning model 56 comprises at least the overview image 30 or an image calculated therewith. For example, the overview image 30 can first undergo a contrast modification, noise reduction, a removal of surface details or an image segmentation, whereupon an image calculated in this manner is input into the machine learning model 56.

The machine learning model 56 has been trained with training data in order to be able to calculate a centring movement 57 directly from an input image. The training data can comprise annotated (training) overview images or annotated images calculated from overview images as described above. A centring movement is stored for each image in the form of an annotation. The centring movements expressed in the annotations can have been specified manually. Alternatively, the annotations can also have been determined (partially) automatically, e.g. by calculating an object localization as described for the other example embodiments and thereby determining a centring movement.

Model parameters of the machine learning model 56 are set in the training so that the outputs calculated by the machine learning model 56 from the input training overview images ideally match the predefined annotations (centring movements). To this end, a loss function can be minimized iteratively. The loss function describes deviations between the annotations and current outputs calculated by the model with the current (not yet finalized) model parameter values based on the input training overview images. By means of, e.g., a gradient descent procedure and backpropagation, the model parameters can be adjusted iteratively until the loss function is minimized. Alternatively, a reward function, which describes matches instead of deviations, can be maximized.

By predefining training overview images with centring movements in the form of annotations, the learning algorithm can determine independently how image content of the input images is to be assessed and processed in order to calculate a centring movement from the same.

Once the centring movement 57 has been determined, a corresponding sample stage adjustment can be carried out and a centred overview image subsequently captured, as described in the foregoing in relation to the other example embodiments.

An example embodiment of a computer program 80 according to the invention comprises the machine learning model 56 of FIG. 9 or the segmentation machine learning model 45 and the regression machine learning model 55 of FIG. 8. Further example embodiments of a computer program according to the invention contain commands the execution of which implements the steps described in relation to the preceding figures, in particular steps S2-S6 and optionally also the remaining steps of FIG. 2. If the performance of a step involves other microscope components (for example, the capture of an overview image in S1 involves an overview camera while the movement of the sample stage in S8 involves a motorized sample stage), the computer program contains commands for controlling these microscope components.

The described example embodiments are purely illustrative and variations of the same are possible within the scope of the attached claims.

LIST OF REFERENCES

1 Microscope
2 Stand
3 Objective revolver
4 Microscope objective
5 Sample stage
6 Holding frame
6A First holding-frame bracket
6B Second holding-frame bracket
6C Concave holding side of first holding-frame bracket 6A
6D Corner of first holding-frame bracket 6A
6E Concave holding side of second holding-frame bracket 6B
6F Corner of second holding-frame bracket 6B
7 Sample carrier
8 Microscope camera
9 Overview camera
10 Field of view of the overview camera
11 Deflection mirror
20 Computing device
25 Predefined object
25i Identifying information relating to a plurality of predefined objects
30 Overview image
40 Segmentation mask
41 Image segment of the first holding-frame bracket 6A
42 Image segment of the second holding-frame bracket 6B
43 BACKGROUND
44 Object detection machine learning model
45 Segmentation machine learning model
50 Segmentation mask
51 Image segment of the sample carrier 7
52 Background
54 Program for calculating the centring movement
55 Regression machine learning model
56 (End-to-end) machine learning model
57 Centring movement
60 Centred overview image
71, 72 Bounding boxes
80 Computer program of the invention
100 Microscopy system of the invention
S1-S9 Steps of a method of the invention

We claim:

1. A method for aligning a sample carrier of a microscope, comprising
capturing an overview image in which the sample carrier or a sample carrier environment is at least partially visible;
assessing the overview image with a machine learning model of a computer program, which performs an object localization in the overview image with respect to at least one predefined object;
evaluating whether the sample carrier is centred in the overview image with the computer program based on the object localization;
if the sample carrier is evaluated as not centred in the overview image:
determining a centring movement based on the object localization with the computer program, wherein the centring movement indicates a sample stage movement for moving the sample carrier towards an image centre of the overview image;
performing a sample stage adjustment based on the centring movement;
capturing a centred overview image after the sample stage adjustment has been performed.

2. The method according to claim 1, which further comprises:
using the centred overview image for further image processing or microscope control and
discarding the overview image.

3. The method according to claim 1,
wherein the machine learning model comprises at least one convolutional neural network for object localization trained with training overview images which at least partially include sample carrier environments and sample carriers.

4. The method according to claim 1,
wherein the object localization with the machine learning model relates to a position of a holding frame or holding frame part, a position of one or more holding frame brackets or a position of a sample carrier.

5. The method according to claim 1,
wherein the machine learning model performs the object localization in one of the following manners:
a segmentation in which image areas belonging to a holding frame are identified in the overview image,
a classification or semantic segmentation, wherein a distinction is made between different holding frame brackets,
a detection of predefined holding frame parts, holding frame screws, holding frame corners or holding frame contours, or a detection of predefined markings, script or labels on the holding frame, or
a localization of an object, a sample carrier or a measurement/calibration sample inserted in a holding frame,
a classification in which a holding frame type or sample carrier type is identified, wherein geometric information is respectively stored for different holding frame types or sample carrier types, which is used to determine the centring movement.

6. The method according to claim 1,
wherein the centring movement indicates solely a direction or both a direction and a path length of the sample stage movement.

7. The method according to claim 1,
wherein one or more further overview images are captured during or after performance of the sample stage adjustment, wherein each further overview image is analysed in order to carry out an object localization and determination of a further centring movement in order to reach, in iterative steps, a position at which the capture of the centred overview image occurs.

8. The method according to claim 1,
wherein contextual data is taken into account by the machine learning model or in the determination of the centring movement, wherein the contextual data relates to one or more of the following:
a temporal context regarding a previous known setting of a holding frame used;
a comparison of a holding frame determined in the overview image with one or more given 3D models of holding frames;
a voice input by a user;
collision information pertaining to the sample stage;
a current sample stage position.

9. The method according to claim 1,
wherein a sample stage position resulting from the centring movement is compared with a stored allowed position range before the centring movement is carried out, and a warning is output if the resulting sample stage position lies outside the allowed position range.

10. The method according to claim 1,
wherein a sample stage is moved automatically according to the centring movement, or
wherein the centring movement is output to a user for a manual sample stage adjustment.

11. The method according to claim 1,
wherein an evaluation occurs regarding whether the capture of a centred overview image will display the sample carrier in full,
wherein the sample stage adjustment and capture of the centred overview image is only implemented in the event of a positive evaluation result and otherwise a capture of a plurality of overview images with different sample stage positions and subsequent stitching of the overview images into an aggregate overview image occurs.

12. A method for aligning a sample carrier of a microscope, comprising:
capturing an overview image in which the sample carrier or a sample carrier environment is at least partially visible;
entering the overview image or an image calculated therewith into a machine learning model, wherein the machine learning model is trained using training data to calculate a centring movement for an input image;
calculating a centring movement with the machine learning model from the input overview image or image calculated therefrom;
performing a sample stage adjustment based on the centring movement;
capturing a centred overview image after the sample stage adjustment has been performed.

13. The method according to claim 12,
wherein the training data comprises annotated training images for which respective centring movements are predefined in the form of annotations.

14. A microscopy system for aligning a sample carrier, comprising:
a microscope configured to capture an overview image in which the sample carrier or a sample carrier environment is at least partially visible;
a computing device configured to assess the overview image with a machine learning model, which performs an object localization in the overview image with respect to at least one predefined object;
wherein the computing device is further configured to evaluate whether the sample carrier is centred in the overview image based on the object localization and, if this is not the case, to determine a centring movement based on the object localization, wherein the centring movement indicates a sample stage movement for moving the sample carrier towards an image centre of the overview image.

15. A computer program for aligning a sample carrier of a microscope, the computer program comprising commands stored on a non-transitory computer-readable medium, which when executed by a computer, cause the computer to perform the following acts:
receiving an overview image in which the sample carrier or a sample carrier environment is at least partially visible;
assessing the overview image with a machine learning model, which performs an object localization in the overview image with respect to at least one predefined object; and
determining a centring movement based on the object localization, wherein the centring movement indicates a sample stage movement for moving the sample carrier towards an image centre of the overview image.

16. The method according to claim 12, which further comprises:
using the centred overview image for further image processing or microscope control and
discarding the overview image.

17. The method according to claim 12,
wherein the centring movement indicates solely a direction or both a direction and a path length of the sample stage movement.

18. The method according to claim 12,
wherein contextual data is taken into account by the machine learning model or in the determination of the centring movement, wherein the contextual data relates to one or more of the following:
a temporal context regarding a previous known setting of a holding frame used;
a comparison of a holding frame determined in the overview image with one or more given 3D models of holding frames;
a voice input by a user;
collision information pertaining to the sample stage;
a current sample stage position.

19. The method according to claim 12,
wherein a sample stage position resulting from the centring movement is compared with a stored allowed position range before the centring movement is carried out, and a warning is output if the resulting sample stage position lies outside the allowed position range.

20. The method according to claim 12,
wherein a sample stage is moved automatically according to the centring movement, or
wherein the centring movement is output to a user for a manual sample stage adjustment.

* * * * *